United States Patent
Saito et al.

(10) Patent No.: US 7,074,345 B2
(45) Date of Patent: *Jul. 11, 2006

(54) HIGHLY LUMINOUS LIGHT-EMITTING MATERIAL AND MANUFACTURING METHOD THEREOF

(75) Inventors: Kenichiro Saito, Chiba (JP); Mieko Sakai, Tokyo (JP); Sumiyo Yamanashi, Tokyo (JP)

(73) Assignee: AVAILVS Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/481,276

(22) PCT Filed: Dec. 27, 2002

(86) PCT No.: PCT/JP02/13819

§ 371 (c)(1),
(2), (4) Date: Feb. 11, 2004

(87) PCT Pub. No.: WO03/057796

PCT Pub. Date: Jul. 17, 2003

(65) Prior Publication Data

US 2004/0137266 A1    Jul. 15, 2004

(30) Foreign Application Priority Data

Dec. 28, 2001  (JP)  ............................. 2001-401992

(51) Int. Cl.
*C09K 11/00*    (2006.01)

(52) U.S. Cl. .................. 252/301.36; 524/401; 524/413

(58) Field of Classification Search .................. 501/32; 252/301.36, 301.4 R, 304.4 S, 301.4 F, 301.4 P, 252/301.4 H, 301.5, 301.6 R, 301.6 S, 301.6 F, 252/301.6 P See application file for complete search history.

(56) References Cited

U.S. PATENT DOCUMENTS

| 4,963,441 | A | * | 10/1990 | Takai et al. .................. 428/690 |
| 5,635,249 | A | * | 6/1997 | Haluska et al. .............. 427/387 |
| 5,976,411 | A | * | 11/1999 | Feng et al. ............. 252/301.35 |
| 6,136,226 | A | * | 10/2000 | Sakai ..................... 252/301.35 |
| 6,309,562 | B1 | * | 10/2001 | Sakai et al. ............. 252/301.36 |

FOREIGN PATENT DOCUMENTS

| JP | 60-55051 | | 3/1985 |
| JP | 60-137862 | | 7/1985 |
| JP | 61-120804 | | 6/1986 |
| JP | 9-40944 | | 2/1997 |
| JP | 11-158205 | * | 6/1999 |
| JP | 2001-11324 | | 1/2001 |

* cited by examiner

*Primary Examiner*—C. Melissa Koslow
(74) *Attorney, Agent, or Firm*—Wenderoth, Lind & Ponack, L.L.P.

(57) ABSTRACT

A photoluminescent material is formed by curing a blend of a transparent base material and a photoluminescent pigment component, wherein the viscosity of the transparent base material is 1 Pa·s(20° C.) or more and is added in an amount of 7 to 95 wt %. Luminescence performance is further improved by taking in consideration the relation between the internal structure of a molding and its luminescence performance, thereby achieving a luminescence of predetermined brightness for an extended period of time.

15 Claims, No Drawings

HIGHLY LUMINOUS LIGHT-EMITTING MATERIAL AND MANUFACTURING METHOD THEREOF

BACKGROUND OF THE INVENTION

1. Field of the Invention

The present invention relates to a high performance photoluminescent material and a production method therefor. More particularly, the invention relates to a novel high performance photoluminescent material and a production method therefor, the material featuring quite a high photoluminescence performance with long lasting visible effect and finding beneficial applications in finishing materials for use with construction materials or civil engineering work materials, a variety of sign materials or marking materials, and installations using such materials.

2. Background Art

Conventionally, an artificial stone material has been known which is prepared by crushing natural stone, mixing the crushed stone with resin or the like, and solidifying the mixture. Various approaches have been taken to provide an artificial stone material featuring a natural stone like design, such as of marble, granite or the like, and also having high hardness and strength.

As an approach to improve the function or performance of such an artificial stone material, the use of a photoluminescent material for imparting a light emitting function is proposed.

For example, a luminescent tile has been proposed, which contains an inorganic filler material, a synthetic resin and a photoluminescent pigment, the inorganic filler material used in concentrations of about 50 wt % or more based on the total weight of the tile (JP-A-60-137862). The luminescent tile is produced as follows. A composition is prepared by blending together 75 wt % of inorganic filler of quartz sand having a mean particle size of at least 0.2 mm, 15 wt % of resin syrup containing an MMA polymer and an MMA monomer in a weight ratio of 25/75, and 9 wt % of photoluminescent pigment. The resultant composition is mold cured into a sheet having a thickness of 3 to 5 mm.

In the case of the luminescent material containing the photoluminescent pigment as described, however, energy saturation obtained from a D65 normal light source of 200 Lx can provide luminescence at a brightness of at least 3 mcd/m$^2$ for no more than a few hours. The above brightness is a low limit to permit the human naked eyes to recognize a contour of an object. The material disclosed in the above publication (JP-A-60-137862) provides luminescence lasting for no more than 1 hour.

Furthermore, the above material also has a problem of an insufficient initial luminescence brightness, or cannot provide such an luminescence as to maintain a sufficient level of brightness for clear visible recognition of objects for a period of about 15 minutes. Such an luminescence period is considered to be necessary for evacuation guide in the event of power failure.

Although the luminescent material incorporates therein the photoluminescent pigment, a surface or at most a 1-mm-deep portion of the material is available for light emission while the photoluminescent pigment present at the deeper portion of the molded body does not work at all.

This results in the aforementioned fundamental problem associated with the luminescence performance that the available depth for light emission is so small and the luminescence period cannot be extended.

Because of these drawbacks, the photoluminescent function is practically utilized only by paints, resin tapes and resin films containing the photoluminescent pigments, although attention is focused on the photoluminescent function which is useful for the evacuation guide and the like in the event of power failure at underground shopping center. Furthermore, as a result of these drawbacks, such paints, resin tapes and resin sheets are short of adequately exhibiting the photoluminescent function.

The photoluminescent pigment is so expensive that the addition of a small amount of the pigment results in a 3-fold to 100-fold increase of the total cost. Therefore, it is not feasible to incorporate the photoluminescent pigment in a portion of the artificial stone where the photoluminescent pigment does not actually contribute to the light emission.

Consequently, the conventional photoluminescent material has quite limited performance and application.

In view of the foregoing, the present inventors have proposed a material containing an inorganic aggregate or filler and a resin, the material which accomplishes high strength, high hardness and a deep color tone like that of the natural stone, which permits an outside portion to work more efficiently by increasing the available depth for light emission by way of a minimum possible amount of photoluminescent pigment, and which achieves a further extension of the luminescence period (see, for example, WO98/39268, 98/35919).

The proposed materials are essentially characterized in that plural types of inorganic materials having significantly different mean particle sizes are used as the inorganic aggregate or filler in a specific mixing ratio, that the inorganic material having a greater particle size is a transparent substance, and that a photoluminescent pigment is admixed as the inorganic material having a smaller particle size, or otherwise is previously attached to the surface of the greater particles of transparent inorganic material by sinter-fuse coating or the like.

The proposed materials are realized based on a new finding that the available depth for light emission from the photoluminescent pigment or the like can be increased by controlling an internal structure of the molded body such as an artificial stone.

In fact, the artificial stone according to the proposal of the inventors is capable of maintaining the luminescence at a brightness of 3 mcd/m$^2$ for more than 8 hours.

The inventors have made the follow-up study with an aim at a further improved photoluminescence performance such as a further extended period of luminescence at a given brightness, or more particularly a further improved photoluminescence performance by way of control of a relation between the internal structure of the molded body such as an artificial stone and the photoluminescence performance thereof.

SUMMARY OF THE INVENTION

The present invention has been made to solve the above problems and provides: firstly, a high performance photoluminescent material formed by blending and curing at least a transparent base material and a photoluminescent pigment component, wherein the transparent base material has a viscosity of 1 Pa·s(20° C.) or more and is present in a concentration of 7 to 95 wt %; secondly, the high performance photoluminescent material, wherein the photoluminescent pigment component has an average particle size of 10 to 2000 µm; thirdly, the high performance photoluminescent material, wherein the transparent base material is a resin.

Further, the present invention provides; fourthly, the high performance photoluminescent material, which further comprises a pigment component other than the photoluminescent pigment; fifthly, the high performance photoluminescent material, wherein B/A defined as the weight ratio of the photoluminescent pigment component A and the other pigment component B is 3.0 or less; sixthly, the high performance photoluminescent material, wherein the other pigment component contains at least one pigment selected from white pigment, yellow pigment, or orange or red pigment; and seventhly, the high performance photoluminescent material, wherein the white pigment is an oxide or complex oxide of zirconium.

Furthermore, the present invention provides: eighthly, the high performance photoluminescent material, further comprising a transparent aggregate; and ninthly, the high performance photoluminescent material, wherein D/C defined as the weight ratio of the transparent base material C and the transparent aggregate D is in the range of 0.1 to 6.

Moreover, the present invention provides, as its tenth aspect, a method for producing a high performance photoluminescent material, which comprises blending a transparent base material with a photoluminescent pigment component or a blend of a photoluminescent pigment component, another pigment component and a transparent aggregate, thereby obtaining a paste, mortar or viscous mass and subjecting it to mold curing; as its eleventh aspect, the method for producing a high performance photoluminescent material, wherein the content of air bubbles per-volume of the paste, mortar or viscous mass is controlled to 2% or less; as its twelfth aspect, the method for producing a high performance photoluminescent material, wherein the blending is carried out in an atmosphere depressurized by at least 50 kPa from ordinary pressure; as its thirteenth aspect, the method for producing a high performance photoluminescent material, wherein the blending is carried out in a stirring apparatus having at least a mixing vessel of which the inner surface and/or stirring blade is coated with a transparent or white coating material. The present invention provides, as its fourteenth aspect, the method for producing a high performance photoluminescent material, wherein the transparent base material has a viscosity of 1 Pa·s(20° C.) or more; as its fifteenth aspect, the method for producing a high performance photoluminescent material, wherein the transparent base material is a resin; as its sixteenth aspect, the method for producing a high performance photoluminescent material, wherein the photoluminescent pigment component has an average particle size of 10 to 2000 µm; as the seventeenth aspect, the method for producing a high performance photoluminescent material, wherein the transparent base material is present in a concentration of 7 to 95 wt %; as its eighteenth aspect, the method for producing a high performance photoluminescent material, wherein B/A defined as the weight ratio of the photoluminescent pigment component A and the other pigment component B is 3.0 or less; as its nineteenth aspect, the method for producing a high performance photoluminescent material, wherein D/C defined as the weight ratio of the transparent base material C and the transparent aggregate D is in the range of 0.1 to 6.

As described above, the invention has been accomplished based on the following findings obtained by the inventors who have made detailed examinations from various viewpoints, aiming to improve the photoluminescence performance of the photoluminescent material containing a photoluminescent pigment. That is, the inventors have found that a high performance photoluminescent mold can be obtained by uniformly dispersing photoluminescent pigment particles of a large size in a transparent base material having a high viscosity, and that the performance of the photoluminescent mold is further increased by preventing the entrance of air bubbles and foreign substances. These findings as well as the invention were absolutely inconceivable or unpredictable even by those skilled in the art.

DESCRIPTION OF THE PREFERRED EMBODIMENTS

The invention has the aforementioned features which will be described by way of an embodiment thereof.

A high performance photoluminescent material according to the invention principally comprises the following components:

a transparent base material, and a photoluminescent pigment.

Further, the high performance photoluminescent material according to the invention may further include the following components:

another pigment, and a transparent aggregate.

It goes without saying that in addition to the above components, any additives including curing catalysts or curing auxiliary agents, viscosity modifiers, UV light deterioration inhibitors, antibacterial agents and the like may be used as required, as long as such an additive does not interfere with the object or effects of the invention.

As to the photoluminescent pigment incorporated in the transparent base material according to the invention, a variety of known pigments and commercially available pigments may be used. For example, strontium aluminate based materials, zinc sulfide and the like are usable. Such photoluminescent pigments may preferably have a mean particle size of at least 10 µm, more preferably, of 30 to 2000 µm, or even more preferably of 100 to 2000 µm.

Conventionally, it was not easy to use photoluminescent pigments having such large particle size. This is because the photoluminescent pigment is hard to be uniformly dispersed in the depth-wise direction of a photoluminescent sheet material, so that the photoluminescent effect tends to appear locally in the proximity of one side of the sheet material.

By allowing the use of a photoluminescent pigment of large particle size, the photoluminescent pigment is allowed to absorb a greater amount of energy, which causes the luminescence to last for an extended period of time.

In the present invention, generally, a mixing ratio of the photoluminescent pigment may preferably be 5 wt % or more based on the total weight of a desired molded body of the photoluminescent material. In the case where the amount of the pigment is less than 5 wt %, the required photoluminescence function may not be fully achieved.

According to the invention, a general standard for the photoluminescence function is set as: the ability to maintain the luminescence at a brightness of 3 mcd/m$^2$, which is the minimum brightness at which the human eye can recognize the contour of an object, for at least 8 hours following energy saturation from a D65 normal light source of 200 Lx. Hence, the proper mixing ratio of the photoluminescent pigment in the transparent base material is selected from this point of view, while combination with other components is also taken into consideration.

For achieving the above photoluminescent effect, the invention employs a transparent base material having a high viscosity of 1 Pa·s(20° C.) or more. The use of the transparent base material having a high viscosity permits the photoluminescent pigment having a relatively large particle size to be uniformly dispersed along the depth-wise direction of the sheet material.

The transparent base material may have a white color or any other colors so long as it has a high light permeability. In general, a preferably employed transparent base material has a UV light permeablitiy of at least 70%, or more preferably of at least 85%. Such a transparent base material may be a resin, glass or the like; when resins are used, preferable examples include methyl methacrylate (MMA) resins including PMMA and modified PMMA, unsaturated polyester resins, epoxy resins, and silicone resins; olefin resins such as polycarbonate resins and polypropylene resins may also usable.

Here, the viscosity of the transparent base material refers to the viscosity of a resin in the form of a liquid, viscous form, or melt such as syrup, paste or mortar that is to be mixed with the photoluminescence pigment. The resin syrup or paste may be a mixture of a polymer, oligomer or monomer.

In the case of an MMA resin, for example, the base material may be a syrup consisting of a mixture of MMA polymer and MMA monomer (e.g., resin syrups commercially available from Mitsubishi Rayon Co., Ltd; Mitsui Chemicals, Inc.; Kuraray Co., Ltd. and the like). The viscosity of the base material may vary in association with the contents of the MMA polymer as listed in Table 1 as below.

TABLE 1

| VISCOSITY Pa·s (20° C.) | CONTENT OF MMA POLYMER (wt %) |
|---|---|
| 1.5 | 25 |
| 2.0 | 27 |
| 3.3 | 29 |
| 5.5 | 31 |
| 10.0 | 33 |
| 14.0 | 35 |

Thus, in the present invention, the use of a resin having a viscosity of at least 2 Pa·s(20° C.) is defined as the use of any of the following materials having a viscosity of at least 1 Pa·s(20° C.) in the form of a liquid, viscous mass or melt:
(1) a resin (polymer) per se,
(2) a mixture of polymer and monomer,
(3) a mixture of polymer and oligomer,
(4) a mixture of oligomer and monomer, and
(5) a mixture of polymer, oligomer and monomer.

However, in the case where the base material has an excessively high viscosity, it becomes extremely difficult to incorporate and disperse the pigment in the base material. Therefore, although not limiting, the maximum viscosity of the base material may be considered to be about 100 Pa·s(20° C.).

The type of transparent base material may be selected depending on the application of the photoluminescent material of the invention, taking into consideration the required physicochemical performance of the photoluminescent material, such as strength, weather resistance, water resistance, and wear resistance.

The amount of the transparent base material used may be in the range of 7 to 95 wt % based on the total weight of the photoluminescent material. In the case where the transparent base material is present in concentrations of less than 7 wt %, its function as a matrix that disperse, binds and holds the inorganic particles, i.e. the photoluminescent pigment, other pigment and aggregate is decreased or lost. As a result, the photoluminescent material cannot attain the required physicochemical performances such as strength, and hence, the desired photoluminescent effect is not achieved. On the other hand, in the case where the amount of the transparent base material exceeds 95 wt %, a significant decrease of the photoluminescence performance is observed.

In the photoluminescent material according to the invention, the photoluminescent pigment may be used in combination with another pigment as required. In this case, a preferred weight ratio B/A between the photoluminescent pigment A and the other pigment B may generally be 3.0 or less. In the case where the weight ratio B/A is more than 3.0, the other pigment, most of which consists of inorganic particles, shields the photoluminescent pigment so that the photoluminescent pigment's ability to absorb energy from external light, accumulate the absorbed energy and emit light is decreased.

The other pigment may have any of various color tones and typically include white pigments, yellow pigments, orange or red pigments. Examples of a suitable white pigment include zirconium oxide pigments, titanium oxide pigments, aluminum hydroxide pigments and the like. Among these, white pigments comprising an oxide such as zirconia (zirconium oxide) or zirconium silicate or a complex oxide are more preferred from the standpoint of the photoluminescent effect because the white pigments have smaller light shielding effect than pigments of other colors.

Examples of a suitable yellow pigment include Chrome Yellow, Cadmium Yellow, Nickel Titan Yellow and the like. Examples of a suitable orange or red pigment include Iron Red, Cadmium Red, Molybdenum Red and the like. Of course, other various pigments such as blue, green and black pigments may be used.

In general, the other pigment may preferably have an average particle size in the range of 0.1 to 70 μm. This is because the pigment particles having a small size of 1.0 μm or 0.1 μm and under tend to shield the photoluminescent pigment particles depending upon the mixing ratio thereof.

It goes without saying that an organic pigment, as required, may be used in combination with the aforementioned inorganic pigment or independently. In addition, the photoluminescent material of the invention may further incorporate therein a transparent aggregate such as silicon, glass, crystal, or molten silica. A preferred mixing ratio D/C defined as the weight ration of the transparent aggregate D and the transparent base material C may normally be in the range of 0.1 to 6.

The transparent aggregate is not only effective for providing and improving the required physical properties such as strength, wear resistance and the like to the mold hardened material, but is also effective in enhancing, through its transparency, the photoluminescent effect of the photoluminescent pigment by way of light permeation through its particles and irregular light reflection at its surface interface.

However, in the case where the transparent aggregate is added to the transparent base material in a weight ratio of less than 0.1, substantial effect in increasing the photoluminescent effect may not be expected. On the other hand, the case where the weight ratio of the transparent aggregate exceeds 6 is not preferable either, in that the transparent aggregate the strength of the mold of the photoluminescent material is impaired.

The transparent aggregate may preferably have a particle size of at least 0.1 mm, or more preferably of at least 0.3 mm, provided that it is not more than ⅓ of the thickness of the mold cured body.

In addition to the transparent aggregate, the transparent base material may further include an inorganic filler, which has a particle size of less than 0.1 mm. Examples of an applicable inorganic filler include molten silica powder, crystal (quartz) powder, calcium carbonate, aluminum hydroxide, plastic powder, glass powder and the like.

The photoluminescent material of the invention is produced by blending a transparent base material with a photoluminescent pigment component or a blend of a photoluminescent pigment component, another pigment component and a transparent aggregate, thereby obtaining a paste, mortar or viscous mass and subjecting it to mold curing.

In such a production method, the preparation of the blend is a very important requirement. The preparation of the blend is especially important in the case where a photoluminescent pigment having a relatively large particle size is used in combination with a transparent base material having a high viscosity as the matrix for dispersing the photoluminescent pigment uniformly.

Here it should be emphasized that the invention provides a method for preparing the blend in the form of a paste, mortar or other viscous mass which contains air bubbles in a percentage of 2% or less per-volume.

The blend is normally prepared by stirring, which is carried out under conditions controlled so as to limit the content of the air bubbles to 2% or less. The type of stirrer selected, the rotational speed for the stirring, the atmosphere during the stirring process and the like may be controlled.

Air bubbles are produced by stirring and the remaining air bubbles are prone to lift those pigment particles having a smaller size or specific gravity than the photoluminescent pigment particles up to the surface of the blended composition during molding, and causes the photoluminescent pigments to be shielded by the pigment particles. Particularly, in the case where the air bubbles are present in the blended composition in a per-volume percentage of more than 2%, the drawback resulting from the shielded photoluminescent pigment becomes non-negligible.

An effective way to control the percentage of the air bubbles is to prepare the blended composition in an atmosphere depressurized by at least 50 kPa from ordinary pressure. It is preferred to increase the degree of depressurization in the case where the transparent base material is glass. The amount of remaining air bubbles can be notably reduced by preparing the blended composition in such a depressurized atmosphere. If the degree of the depressurization is low, adequate effect to control the air bubbles cannot be attained.

The percentage of the air bubbles may be determined, for example, by filling a vessel with the blend and determining the percentage of volumetric change when the atmospheric pressure is reduced from ordinary pressures to zero atmospheres.

Further, prevention of contamination (entrance of foreign substances) during the preparation of the blend is also effective to increase the photoluminescence performance. In particular, it is preferred to minimize the entrance of foreign substances, such as metal from the stirrer.

Thus, in the present invention, the entrance of such foreign substances may effectively be prevented by employing a a stirring apparatus having at least a mixing vessel of which the inner surface and/or stirring blade are harder than the pigment and transparent aggregate. An alternative means may be to coat a transparent or white coating material on the inner surface of the mixing vessel and the stirring blades. Such a coating material will exert little or no influence on the photoluminescence performance even if the coating material produces a minute amount of foreign substance.

Examples of the transparent or white coating material include an alumina film formed by spray coating, a ceramic plate bonded, glass, silicone rubber, silicone resin, fluorine resin, MMA resin and the like.

The resultant blend in the form of a paste, mortar or other viscous mass is poured into a suitable mold and cured. Thus the photoluminescent material of the present invention is provided as a molding of a predetermined shape.

Meantime, in the case where the molding sustains a significant shielding at its surface due to the lifting of the pigment particles other than the photoluminescent pigment, the shielding layer (portion) maybe effectively removed by cutting or water-jet grinding the surface of the mold cured member.

Hereinafter the embodiment of the invention will be described in further detail with reference to the following examples. In the following examples, the photoluminescent performance was evaluated in the following manner according to JIS "Photoluminescent Safety Sign" Z9100-1987. That is, a sample was irradiated with a light of 200 Lx from a D65 normal light source to saturation and the time it takes for the brightness to drop to 3 mcd/m$^2$ was measured. The elapsed time was used as the evaluation standard.

As a matter of course, the invention is not limited by the following examples.

EXAMPLES

Example 1

A variety of MMA resin syrups including a mixture of an MMA polymer and an MMA monomer were prepared, the resin syrups having different MMA polymer contents and viscosities. Each of the resin syrups was admixed with a photoluminescent pigment component and the like in the following proportion (weight ratio).

| | |
|---|---|
| MMA resin syrup: | 35.5 |
| Curing agent: | 0.5 |
| strontium aluminate based photoluminescent pigment: (available from Nemoto & Co., Ltd. Average particle size: 100 μm) | 50.5 |
| Aluminum hydroxide: (Average particle size: 10 μm) | 14.0 |

The blending step was carried out under a depressurized atmosphere at 0.1 kPa, while controlling the inclusion of the air bubbles in the blended composition to a per-volume percentage of not more than 1%.

The resultant blended composition was poured into a plate-like mold having a thickness of 5 mm and cured.

The mold cured samples were each evaluated for the photoluminescence performance by measuring an elapsed time before the luminescence dropped to 3 mcd/m$^2$. The results are listed in Table 2 as below.

TABLE 2

| MMA RESIN SYRUP Viscosity Pa · s (20° C.) | ELAPSED TIME BEFORE DROP TO 3 mcd/m² (Hr) |
|---|---|
| 0.5 | 3 |
| 1.0 | 8 |
| 1.5 | 9 |
| 2.0 | 10 |
| 6.0 | 14 |
| 10.0 | 14 |

Table 2 shows that the resin syrup having the viscosity of less than 1.0 Pa·s(20° C.) cannot maintain the luminescence at 3 mcd/m² or more for more than 8 hours. On the other hand, the resin syrups having the viscosities of more than 1.0 Pa·s(20° C.) can maintain the luminescence at 3 mcd/m² or more for more than 14 hours which is much longer than 8 hours.

Example 2

Mold cured samples were formed the same way as in Example 1 using the MMA resin syrup having a viscosity of 6.0 Pa·s(20° C.), except that strontium-aluminate-based photoluminescent pigments having different particle sizes were used.

Each of the samples was measured for the elapsed time before the luminescence dropped to 3 mcd/m². The results are listed in Table 3 as below.

TABLE 3

| AVERAGE PARTICLE SIZE (μm) | ELAPSED TIME BEFORE DROP TO 3 mcd/m² (Hr) |
|---|---|
| 5 | 3 |
| 10 | 8 |
| 30 | 9 |
| 50 | 11 |
| 100 | 14 |
| 150 | 18 |
| 300 | 22 |

It was confirmed that a dramatic improvement of the photoluminescence performance was achieved by using the photoluminescent pigments having great particle sizes. In the case of the photoluminescent pigment having a particle size of less than 10 μm, on the other hand, it was also confirmed that the luminescence at 3 mcd/m² or more did not last for more than 8 hours.

Example 3

Blended compositions were prepared the same way as in Example 1 using the MMA resin syrup having a viscosity of 6.0 Pa·s(20° C.), except that the stirring step was carried out under varied atmospheres and the stirrer was changed.

Each of the samples was measured for the elapsed time before the luminescence dropped to 3 mcd/m². The results are listed in Table 4 as below. In Table 4, the degree of depressurization (kPa) indicates the degree of pressure reduction from the normal pressures.

Used stirrers A, B and C had the following arrangements:

A: Inside surface of a mixing vessel and stirring blades were formed of stainless steel;

B: The stirrer A with a silicone rubber coating overlaid on the stirring blades only;

C: The stirrer A with the silicone rubber coating overlaid on the inside surface of the mixing vessel and on the stirring blades.

TABLE 4

| DEPRESSURIZATION DEGREE (kPa) | STIRRER | ELAPSED TIME BEFORE DROP TO 3 mcd/m² (Hr) |
|---|---|---|
| 90 | A | 14 |
| 80 | A | 14 |
| 60 | A | 13 |
| 50 | A | 8 |
| 30 | A | 7 |
| 50 | B | 10 |
| 60 | B | 15 |
| 80 | C | 18 |

It is demonstrated that the depressurization by at least 50 kPa is effective and that the silicone rubber coating on the inside surface of the stirrer and on the stirring blades contributes to the excellent performance.

Example 4

An MMA resin syrup (viscosity: 6.0 Pa·s(20° C.)) including a mixture of an MMA polymer and an MMA monomer was prepared and admixed with a photoluminescent pigment and the like in the following proportion (weight ratio).

| | |
|---|---|
| MMA resin syrup: | 35.5 |
| Curing agent: | 0.5 |
| strontium aluminate based photoluminescent pigment: (available from Nemoto & Co., Ltd., Average particle size: 150 μm) | 54.0 |
| Another pigment: (Average particle size: 30 μm) | 10.0 |

Mold cured samples employing different pigments were formed the same way as in Example 1 and were each measured for the elapsed time before the luminescence dropped to 3 mcd/m². The results are listed in Table 5 as below.

TABLE 5

| OTHER PIGMENTS | ELAPSED TIME BEFORE DROP TO 3 mcd/m² (Hr) |
|---|---|
| TITANIUM OXIDE | 8 |
| ALUMINUM HYDROXIDE | 15 |
| TITANIUM OXIDE(50): ALUMINUM HYDROXIDE(50) | 10 |
| ZIRCONIA | 18 |
| ZIRCONIA(50): ALUMINUM HYDORXIDE(50) | 17 |

The results show that zirconia as a white pigment presents an excellent photoluminescence performance because of its small shielding effect.

Example 5

Mold cured samples were formed the same way as in Example 4 using aluminum hydroxide as the other pigment, except that the mixing ratio of the photoluminescent pigment A and aluminum hydroxide B was varied. Each of the samples was measured for the elapsed time before the luminescence dropped to 3 mcd/m². The results are listed in Table 6 as below.

TABLE 6

| WEIGHT RATIO (B/A) | ELAPSED TIME BEFORE DROP TO 3 mcd/m² (Hr) |
|---|---|
| 0.150 | 15 |
| 0.185 | 15 |
| 1.05 | 14 |
| 2.25 | 9 |
| 3.54 | 6 |

It was confirmed that the weight ratio B/A in excess of 3 resulted in a sharp decline of the photoluminescence performance.

Example 6

Mold cured samples were formed the same way as in Example 4 using aluminum hydroxide as the other pigment, except that the mixing ratio of the following components was varied. Each of the samples was measured for the elapsed time before the luminescence dropped to 3 mcd/m². The results are listed in Table 7 as below.

TABLE 7

| MMA RESIN SYRUP | PHOTOLUMINESCENT PIGMENT | ALUMINUM HYDROXIDE | ELAPSED TIME BEFORE DROP TO 3 mcd/m² (Hr) |
|---|---|---|---|
| 10.2 | 59.0 | 30.0 | 14 |
| 22.5 | 43.0 | 20.0 | 15 |
| 35.5 | 54.0 | 10.0 | 15 |
| 68.6 | 25.0 | 5.4 | 9 |
| 95.0 | 4.5 | 0 | 6 |
| 98.0 | 1.7 | 0 | 2 |

It is understood that in the case where the amount of the transparent base material is more than 95%, a significant decline of the photoluminescence performance results. With the transparent base material present in a concentration of 95%, the luminescence at 3 mcd/m² or more is maintained for 6 hours by virtue of the use of the photoluminescent pigment having a large particle size. Such a result has never been expected in the art. In the case where the amount of the transparent base material is less than 7%, a mold cured member could not be formed due to the occurrence of rupture.

Example 7

A mold cured sample was formed the same way as in Example 4 using aluminum hydroxide as the other pigment, except that a silicone resin (KE131OS commercially available from Shin-Etsu Chemical Co., Ltd.) was used in place of the MMA resin syrup. The silicone resin had a viscosity of about 50 Pa·s(20° C.).

The resultant sample achieved the luminescence at 3 mcd/m² or more lasting for 14 hours, thus showing an excellent photoluminescence performance.

Example 8

A sample was formed the same way as in Example 4 using aluminum hydroxide as the other pigment, except that the strontium-aluminate-based photoluminescent pigment was used in a ratio of 24.0 and that quartz powder having a mean particle size of 50 μm, as the transparent aggregate, was used in a ratio of 30.0.

Despite a substantial decrease of the mixing ratio of the photoluminescent pigment, the sample favorably achieved the luminescence at 3 mcd/m² or more lasting for about 13 hours.

The weight ratio of the transparent base material C and the aggregate D was 0.845. A test was conducted by varying the weight ratio of these components and the results showed photoluminesence performances varied as shown in Table 8 below.

TABLE 8

| WEIGHT RATIO (D/C) | ELAPSED TIME BEFORE DROP TO 3 mcd/m² (Hr) |
|---|---|
| 0.584 | 12 |
| 0.613 | 13 |
| 0.845 | 13 |
| 1.54 | 14 |
| 3.32 | 14 |
| 4.85 | 10 |
| 5.95 | 8 |
| 6.82 | 5 |

As described in the foregoing, the invention provides the high performance photoluminescent mold by uniformly dispersing the photoluminescent pigment having a large particle size in the transparent base material having a high viscosity. Furthermore, an even more excellent performance is achieved by preventing the entrance of air bubbles and foreign substances.

Thus is provided a novel photoluminescent material which is inconceivable or unpredictable for those skilled in the art.

Example 9

Samples were formed the same way as in Example 1 using high viscosity silicon-rubber as the transparent base material (KE1603, commercially available from Shin-Etsu Chemical Co., Ltd.) having a viscosity of 70 Pa·s (20° C.) in place of the MMS resin syrup, strontium aluminate based photoluminescent pigment (available from Nemoto & Co., Ltd. Average particle size: 150 μm). Quartz powder having an average particle size of under 1 mm or 1 mm~2.3 mm was used as the transparent arregate case by case.

Samples were formed as plate having a thickness of 1 mm, 3 mm or 5 mm.

Each sample was evaluated fro the photoluminescence performance. The results are listed in Table 9.

Table 9 shows that photoluminescence performance is realized at the condition of small amount of photoluminescent pigment and thin thickness.

Furthermore, in detailed, the case having larger thickness of plate realizes high photoluminescence performance. However, same photoluminescent performance is realized in cases having thickness of more than 3 mm. The case blended with quarts powder realizes high photoluminescence performance.

TABLE 9

| EXPERIMENT No. | COMPOSITION | | | | PHOTO LUMINESCENCE PERFORMANCE | |
|---|---|---|---|---|---|---|
| | PHOTOLUMINESCENT PIGMENT | | TRANSPARENT QUARTZ POWDER | | FORMED PLATE | INITIAL |
| | BEST MATERIAL K E 1603 | AVERAGE PARTICLE SIZE 150 μm | 1 ~ 2.3 mm | 1 mm under | THICKNESS | BRIGHTNESS cd    3 mcd/m² |
| A-1 | 65 | 15 | 20 | | 5 mm | 0.3316    15 H |
| A-2 | 65 | 15 | | 20 | 5 mm | 0.3387    14 H 15 M |
| A-3 | 65 | 15 | | 20 | 3 mm | 0.31      13 H 15 M |
| A-4 | 65 | 15 | | 20 | 1 mm | 0.2009    7 H 45 M |
| B-1 | 60 | 8 | 32 | | 5 mm | 0.2452    11 H 15 M |
| B-2 | 60 | 8 | | 32 | 5 mm | 0.2307    10 H 15 M |
| B-3 | 60 | 8 | | 32 | 3 mm | 0.1904    9 H 15 M |
| B-4 | 60 | 8 | | 32 | 1 mm | 0.1058    6 H |
| C-1 | 85 | 15 | | | 5 mm | 0.332     13 H 45 M |
| C-2 | 85 | 15 | | | 3 mm | 0.2679    11 H 15 M |
| C-3 | 85 | 15 | | | 1 mm | 0.1661    9 H |
| D-1 | 92 | 8 | | | 5 mm | 0.2186    10 H 30 M |
| D-2 | 92 | 8 | | | 3 mm | 0.1703    9 H 30 M |
| D-3 | 92 | 8 | | | 1 mm | 0.09575   5 H 45 M |

INDUSTRIAL APPLICABILITY

As described in detail above, the present invention realizes a high performance photoluminescent material by uniformly dispersing a photoluminescent pigment of large particle size in a transparent base material of high viscosity. Further, by preventing the interfusion of air bubbles and contaminants, higher performance is achieved.

Thus, a novel photoluminescent material that was not conceivable or predictable from the prior art is provided.

What is claimed is:

1. A high performance photoluminescent material which comprises a cured composition of at least a transparent base material and a photoluminescent pigment component, wherein the transparent base material before curing has a viscosity of 2.0 Pa·s(20° C.) or more in the form of a liquid, viscous form, or melt and is present in a concentration of 7 to 95 wt %, and wherein the photoluminescent pigment component has a mean particle size of 150 to 2000 μm.

2. The high performance photoluminescent material as claimed in claim 1, wherein the transparent base material is a resin.

3. The high performance photoluminescent material as claimed in claim 1, which further comprises a pigment component other than the photoluminescent pigment.

4. The high performance photoluminescent material as claimed in claim 3, wherein B/A defined as the weight ratio between the photoluminescent pigment component A and the other pigment component B is 3.0 or less.

5. The high performance photoluminescent material as claimed in claim 3, wherein the other pigment component contains at least one pigment selected from white pigment, yellow pigment, orange pigment or red pigment.

6. The high performance photoluminescent material as claimed in claim 5, wherein the white pigment is an oxide or complex oxide of zirconium.

7. The high performance photoluminescent material as claimed in claim 1, further comprising a transparent aggregate.

8. The high performance photoluminescent material as claimed in claim 7, wherein D/C defined as the weight ratio between the transparent base material C and the transparent aggregate D is in the range of 0.1 to 6.

9. A method for producing a high performance photoluminescent material, which comprises: blending 7 to 95 wt % of a transparent base material based on the weight of the high performance photoluminescent material, having a viscosity of 2.0 Pa s (20° C.) or more, in the form of a liquid, viscous form or melt with a photoluminescent pigment component having a mean particle size of 150 to 2000 μm or a blend of a photoluminescent pigment component having a mean particle size of 150 to 2000 μm, another pigment component and a transparent aggregate, thereby obtaining a paste, mortar or viscous mass; and subjecting it to mold curing.

10. The method for producing a high performance photoluminescent material as claimed in claim 9, wherein the content of air bubbles per-volume of the paste, mortar or viscous mass is controlled to 2% or less.

11. The method for producing a high performance photoluminescent material as claimed in claim 9, wherein the blending is carried out in an atmosphere depressurized by at least 50 kPa from ordinary pressure.

12. The method for producing a high performance photoluminescent material as claimed in claim 9, wherein the blending is carried out in a stirring apparatus having at least a mixing vessel of which the inner surface and/or stirring blade is coated with a transparent or white coating material.

13. The method for producing a high performance photoluminescent material as claimed in claim 9, wherein the transparent base material is a resin.

14. The method for producing a high performance photoluminescent material as claimed in claim 9, wherein B/A defined as the weight ratio between the photoluminescent pigment component A and the other pigment component B is 3.0 or less.

15. The method for producing a high performance photoluminescent material as claimed in claim 9, wherein D/C defined as the weight ratio between the transparent base material C and the transparent aggregate D is in the range of 0.1 to 6.

* * * * *